UNITED STATES PATENT OFFICE.

JOHN J. BOERICKE, OF MERION, PENNSYLVANIA.

METHOD OF RECOVERING VALUES FROM BY-PRODUCTS AND ORES.

1,259,595. Specification of Letters Patent. Patented Mar. 19, 1918.

No Drawing. Application filed July 20, 1914, Serial No. 851,888. Renewed August 7, 1917. Serial No. 184,977.

*To all whom it may concern:*

Be it known that I, JOHN J. BOERICKE, a citizen of the United States, residing at Merion, in the county of Montgomery and State of Pennsylvania, have invented certain new and useful Improvements in Methods of Recovering Values from By-Products and Ores, of which the following is a specification.

This invention has reference to the recovery of values from by-products and from ores, and it has particular reference to the recovery of values usually lost in carrying out the reduction of the rarer metals and their alloys from their ores and oxids by what is known as the alumino-thermic process.

In practising the alumino-thermic reduction of metals and their alloys, I have found that valuable material containing the reducible product in more or less important percentages is either rejected from the crucible or container or in other cases, is carried off in volatile form. I have also found that in treating raw materials so that they may be best suited for the alumino-thermic reduction, there are various waste products containing the reducible product.

By way of illustration, in the reduction of vanadium from vanadium ores, I have found that the slag which is formed in the crucible during the reduction and which is usually rejected, contains a percentage of vanadium sufficiently high to warrant its recovery. The vapor which has formed during the reduction also contains vanadium usually in the form of $V_2O_5$ in reducible quantities. In the treatment of certain vanadium bearing ores in an oxidizing roast preparatory to reduction by the thermic process a certain percentage remains in the waste products which is usually thrown away.

My improved method has in view the recovery of values lost in such wastes as just above indicated, and as the method is practically the same in each case, I shall describe it as used in the recovery of vanadium from the fumes given off during the alumino-thermic reduction.

As previously stated, vanadium in the form of $V_2O_5$ is contained in the fumes or vapors, and I carry off the vapor by a pipe or other suitable means in which it is cooled and condenses in the form of a powder-like deposit. I collect this deposit and fuse or roast it with a flux, such as an alkali or an alkaline salt, which will combine with the values to be recovered, and which, when so combined, will form a compound soluble in water. The resulting roasted or fused product is then lixiviated, that is, leached with water. The solution is drawn off and brought to a neutral or a nearly neutral condition, by the addition of an acid, such for example, as hydrochloric acid, and from this solution the values are precipitated by means of chlorinated lime, calcium hypochlorite or equivalent precipitant. The precipitate so obtained and recovered is then dried and reduced by any of the well known processes.

In the case of slag containing values to be recovered, the slag is usually broken up and roasted or fused in the manner just above described, after which the process is the same.

I claim:

1. The herein described process of recovering vanadium values which consists in roasting the material containing the values with an alkali to form a compound soluble in water, in leaching the compound, in bringing the solution to a substantially neutral condition, and then in precipitating the values from the resulting solution, by means of chlorinated lime.

2. The herein described process of recovering vanadium values which consists in roasting the material containing the values with an alkali to form a compound soluble in water, in leaching the compound, in bringing the solution to a substantially neutral condition, and then in precipitating the values from the resulting solution by means of calcium hypo-chlorite.

3. The herein described process of recovering vanadium values from vanadiferous fumes which consists in condensing the fumes, in roasting the deposit with a flux forming a compound soluble in water, in leaching the compound, in neutralizing the solution, and then in precipitating the values from the resulting solution by an oxy-acid compound of chlorin.

In testimony whereof I have hereunto signed my name in the presence of the two subscribed witnesses.

JOHN J. BOERICKE.

Witnesses:
L. A. MYERS,
ARTHUR SYNNESTVEDT.